United States Patent [19]
Dändliker et al.

[11] Patent Number: 5,317,147
[45] Date of Patent: May 31, 1994

[54] METHOD AND APPARATUS FOR ABSOLUTE MEASUREMENT OF FORCE BY USE OF POLARIZED, NON-COHERENT LIGHT AND COMPENSATION OF STRAIN-INDUCED BIREFRINGENCE EFFECTS IN A SINGLE MODE-FIBER OPTIC WAVEGUIDE

[75] Inventors: René Dändliker, Neuchâtel; Edwin Schweizer, Sevelen; Hanspeter Schad, Grabs, all of Switzerland; Walter Odoni, Schaan, Liechtenstein

[73] Assignee: Hilti Aktiengesellschaft, Fürstentum, Liechtenstein

[21] Appl. No.: 8,927

[22] Filed: Jan. 26, 1993

[30] Foreign Application Priority Data

Jan. 28, 1992 [DE] Fed. Rep. of Germany ....... 4202185

[51] Int. Cl.$^5$ ................................................. H01J 5/16
[52] U.S. Cl. ........................... 250/227.17; 250/227.21; 250/231.19; 356/368
[58] Field of Search ............... 250/225, 227.15, 227.16, 250/227.17, 227.19, 227.21, 231.19; 73/800; 356/368

[56] References Cited

U.S. PATENT DOCUMENTS

| | | | |
|---|---|---|---|
| 4,269,483 | 5/1981 | Feldtkeller | 356/368 |
| 4,516,021 | 5/1985 | Taylor | 250/227.17 |
| 4,740,078 | 4/1988 | Daendliker | 250/227.17 |
| 4,866,372 | 9/1989 | Aoshima et al. | 356/368 |
| 5,064,270 | 11/1991 | Turpin et al. | 250/227.17 |

Primary Examiner—David C. Nelms
Assistant Examiner—Stephone B. Allen
Attorney, Agent, or Firm—Anderson Kill Olick & Oshinsky

[57] ABSTRACT

The present invention discloses a method and an apparatus which enables one to obtain definite non-modulo-$2\pi$-dependent measurements wherein a method for the fiber-optic measurement of force, which is based upon the strain-induced birefringence of a single-mode light waveguide, provides a compensation method for the phase differences of two linear modes of the exiting light waves, which are caused by the force acting on the light waveguide and the consequent change in birefringence. In one embodiment of the method, a liquid crystal cell, the birefringence effect of which can be controlled electrically, is used as a compensation element. The maximum of an autocorrelation function, which occurs as an image, and the respective voltage at the liquid crystal cell, are evaluated as a measurement for the birefringence which is to be compensated for and, accordingly, for the effective force. In an alternate embodiment of the method, the two partial waves are directed transversely relative to the propagation direction of the wave fronts by an optical component with linearly space-dependent birefringence. The autocorrelation function can then be obtained as a spatial coordinate and can be plotted electronically by a line detector such as a line array. The location of the maximum of the autocorrelation function is, under certain defined conditions, a measurement for the birefringence which is caused in the light waveguide by mechanical tension from which the magnitude of the force, which acts on the force sensor, can be calculated.

10 Claims, 7 Drawing Sheets

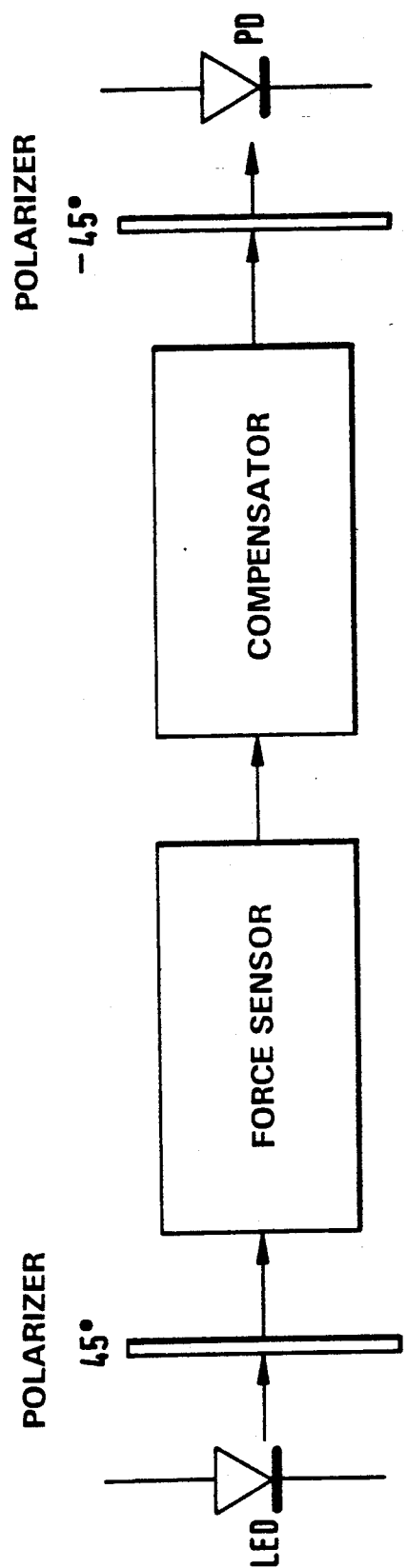
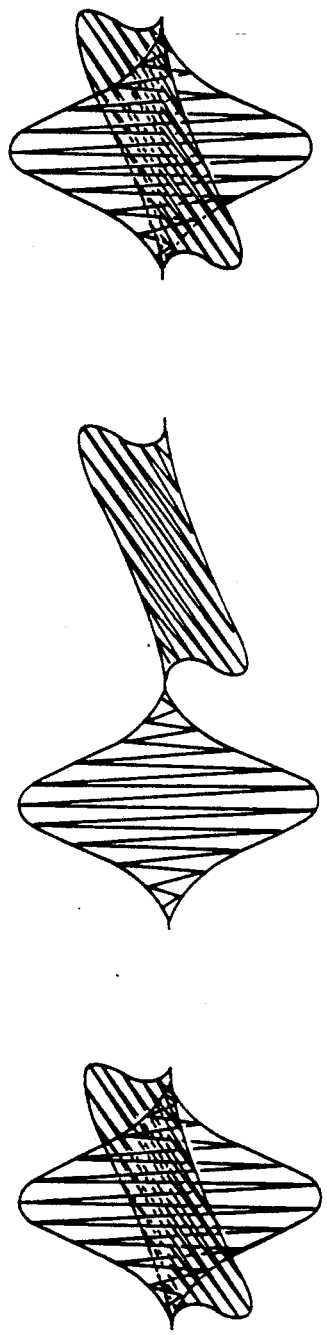
Fig. 1

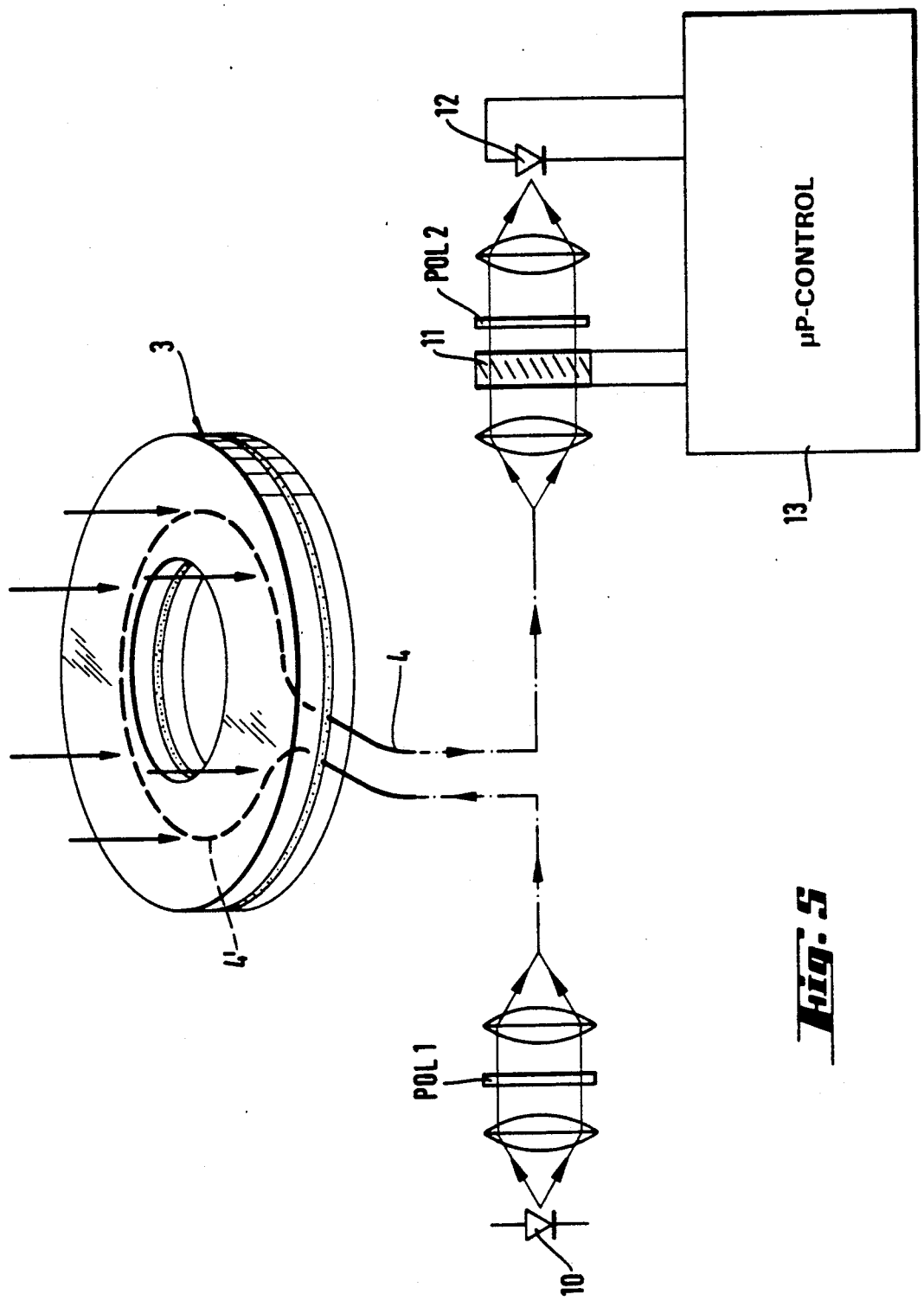

METHOD AND APPARATUS FOR ABSOLUTE MEASUREMENT OF FORCE BY USE OF POLARIZED, NON-COHERENT LIGHT AND COMPENSATION OF STRAIN-INDUCED BIREFRINGENCE EFFECTS IN A SINGLE MODE-FIBER OPTIC WAVEGUIDE

FIELD OF THE INVENTION

The invention is directed to a method and an apparatus for the fiber-optic measurement of force which is based on the strain-induced change in the birefringence of a single-mode light waveguide.

BACKGROUND OF THE INVENTION

It is known that a single-axis (uniaxial) birefringence, which is characterized by two refraction indices, can be induced in a fiber-optic light waveguide (LWL) by a mechanical tension field which is transverse to the axis of the LWL. The propagation velocity of the light wave is accordingly dependent on the direction of the polarization. The extraordinary refraction index applies to the direction which is parallel to the tension axis (optical axis) and the ordinary refraction index applies to the direction which is vertical thereto. The differential of the refraction indices, which is often referred to as the relative birefringence, is a measurement for the applied mechanical tension.

Linearly polarized light is split vectorially in its oscillating direction into these two distinguished orthogonal directions and propagates at different velocities. After passing through the birefringent layer, the interference of the partial waves, particularly the two linear modes, can be effected by means of a polarizer. This also applies in principle for the polarized light of a white light source, e.g. a halogen lamp or a broad-band light-emitting diode (LED), but with the known restriction that interference (amplitude superposition) occurs only so long as the phase displacement does not substantially exceed the coherence length of the light wave. In this case, the intensities sum up to form a mean intensity which is not sensitive to the change in the birefringence.

Continuous phase displacement, as is possible in an interferometer, results in interference stripes which are amplitude-modulated with a so-called coherence function or white light interference.

Methods are discussed in the U.S. Pat. Application Ser. No. 07/795,725, which is assigned to the Assignee of the present application, the contents of which are hereby incorporated by reference herein, which enable a measurement of this phase difference. One of these methods is based on a compensating process. The magnitude of a control signal, which is required for the compensation, is then used as a measurement for the mechanical strain which acts on the sensor.

The degree of sensitivity to which the compensation can be adjusted is essential for a compensating process. This depends on the utilized light source, its coherence length and the autocorrelation.

SUMMARY OF THE INVENTION

The present invention has the object of improving the previously known process for compensation, particularly increasing the sensitivity, without mechanically actuated component parts as far as possible. This simultaneously provides the foundations for a measuring device which can be produced economically and by means of which the forces, particularly pretensioning, in highly-loaded mechanical structural component parts, can be determined reliably and so as to be producible at any time.

The present invention is directed to a method for the fiber-optic measurement of force, which is based on the strain-induced change in the birefringence of a single-mode light waveguide which is embedded, at least along a part of its length, in a plane situated vertically relative to a pretensioning force between disks which distribute the pretensioning force along their surfaces. In this method, polarized, non-coherent light is beamed into one end of the light waveguide and the phase difference, of the two linear modes of the light waves which exit at the other end of the light waveguide, and which is caused by the force which acts on the light waveguide and the consequent change in birefringence, is determined or compensated for in order to achieve definite measurements, i.e. the absolute measurement. If necessary, the control signal, which is required for compensation, is evaluated as a measurement for the force. As noted above, U.S. Pat. Application Ser. No. 07/795,725, which is assigned to the Assignee of the present application, is hereby incorporated by reference herein.

The object of the present invention is met by two different methods. In one method, in which the phase difference, of the two linear modes of the light waves which exit at the opposite end of the light waveguide, and which is caused by the change in birefringence, which results from the force which acts on the light waveguide, is compensated for and further in which the control signal, which is required for compensation, is evaluated as a measurement for the force, a liquid-crystal cell, the birefringence of which is constantly changed by the control signal, is used as a compensator element. Changes in intensity, shown on the liquid crystal cell as an image of an autocorrelation function (AKF) as a function of the control signal, are photoelectrically detected. A selection signal is automatically checked at the maximum of the AKF. In so doing, a regulating process is established, in particular, for determining the respective voltage of the control signal.

According to the present invention, another possibility within the framework of the compensation method, consists in determining the maximum by determining a plurality of intensity values lying within the coherence length by means of an algorithm, which is suitable for the so-called gravity determination.

In order to determine the phase difference which is caused by a changing birefringence in the light waveguide, which is in turn caused by the action of force, it is suggested, according to a second method of the invention, that the fronts of the two light sources, which exit with linear modes, be directed transversely relative to the propagation direction by means of an optical component with a linearly space-dependent birefringence. In this method, the autocorrelation function (AKF), which is imaged on the surface of this optical component from which the light exits, is determined by a line detector and its selection signal sequence is evaluated in a computing process for determining the maximum of the AKF.

A Wollaston prism, a Rochon prism, a quartz wedge or a Michelson interferometer, which is outfitted with slanted mirrors, are particularly suitable as such an optical component with linearly space-dependent birefringence.

The maximum of the AKF can be reliably determined with the two fundamental methods according to the present invention. The first method is distinguished by the use of comparatively very simple optics. The second method, according to the present invention, is distinguished by an extensively unlimited linear measurement range. Due to the very quick response behavior, the present invention may find applications in the areas of real-time measurement and in dynamic measurements, as the compensation value can be determined simply and precisely with a high temperature stability of the measuring arrangement, which is due to the extensively linear behavior.

Accordingly, it is an object of the present invention to provide a method and an apparatus for the fiber-optic measurement of force which provides an improvement over the prior art process or processes for compensation, particularly increasing the sensitivity without mechanically actuated component parts as far as possible.

It is another object of the present invention to provide a method and an apparatus which in turn provides for a measuring device which can be produced economically and by means of which the forces, particularly the pretensioning, in highly loaded mechanical structural component parts, can be determined reliably and so as to be produced at any time.

It is yet another object of the present invention to provide a method and an apparatus for the fiber-optic measurement of force in which the phase difference, of two linear modes of light waves which exit at an opposite end of a light waveguide, which are caused by the change in the birefringence which results from the force acting on the light waveguide, is compensated for and in which the control signal required for compensation is evaluated as a measurement for the force.

It is yet another object of the present invention to provide a method and an apparatus for the fiber-optic measurement of force in which the fronts of two light sources which exit the apparatus with linear modes, are directed transversely relative to the propagation direction by means of an optical component with a linearly space-dependent birefringence, and wherein an autocorrelation function, which is imaged on the surface of the optical component from which the light exits, is determined by a line detector and its selection signal sequence is evaluated in a computing process for determining the maximum of the autocorrelation function.

Other objects and advantages of the present invention will be apparent to those persons skilled in the art upon a review of The Description of the Preferred Embodiment taken in conjunction with the Drawings which follow.

BRIEF DESCRIPTION OF THE DRAWINGS

In the Drawings:

FIG. 1 illustrates a simplified diagram of the principle of a compensating arrangement in the fiber-optic measurement of force;

FIG. 5 illustrates the basic measurement arrangement in the fiber-optic measurement of force with the use of a liquid-crystal cell as a compensator element according to an embodiment of the invention;

DESCRIPTION OF THE PREFERRED EMBODIMENT

Figure 2:
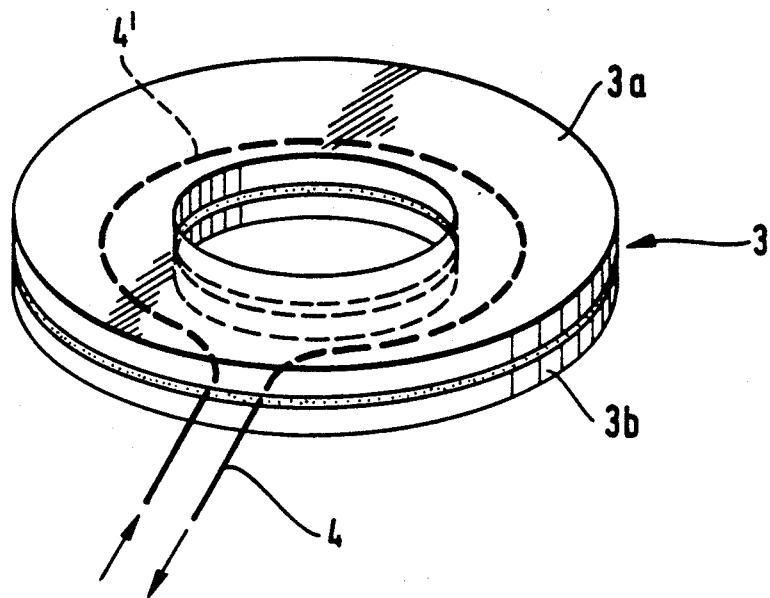
FIGS. 2 and 3 illustrate an embodiment for the force sensor which is constructed as a fiber-optic light waveguide and embedded in a force-transmitting disk.
Figure 3:
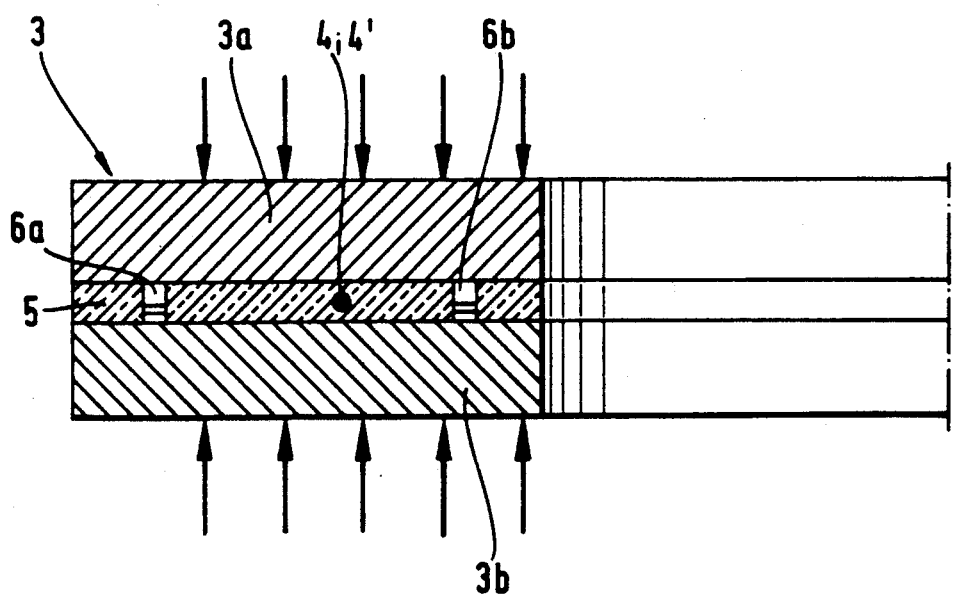

FIG. 1 illustrates a simplified diagram of the principle of a compensating arrangement in the fiber-optic measurement of force. FIGS. 2 and 3 illustrate an embodiment for the force sensor which is constructed as a fiber-optic light waveguide and embedded in a force transmitting disk.

In order to measure the pretensioning force in a highly loaded structural member, e.g. in a heavy-duty dowel, according to the present invention, a light waveguide 4, i.e. the LWL, as shown in FIGS. 2 and 3, is embedded in a supporting disk or washer 3 or between two disks 3a, 3b along a partial area 4' of its length. Since the LWL 4 by itself cannot absorb the typical pretensioning forces of, for example, 10 to 30 kN, which is distributed along a loop length of the clamped partial area 4' of, for example, 60 mm, the supporting disk 3 must be modified in such a manner that the LWL 4 need only withstand the corresponding surface fraction and be protected from overloading and corrosion by a shell or casing 5 as well as by additional pressure-absorbing spacer rings 6a and 6b, if necessary. Certain glass solders, without creep or hysteresis behavior and with a thermal expansion coefficient, which is adapted to that of the fiber of the LWL 4, are particularly suitable for this shell 5.

Figure 4A:
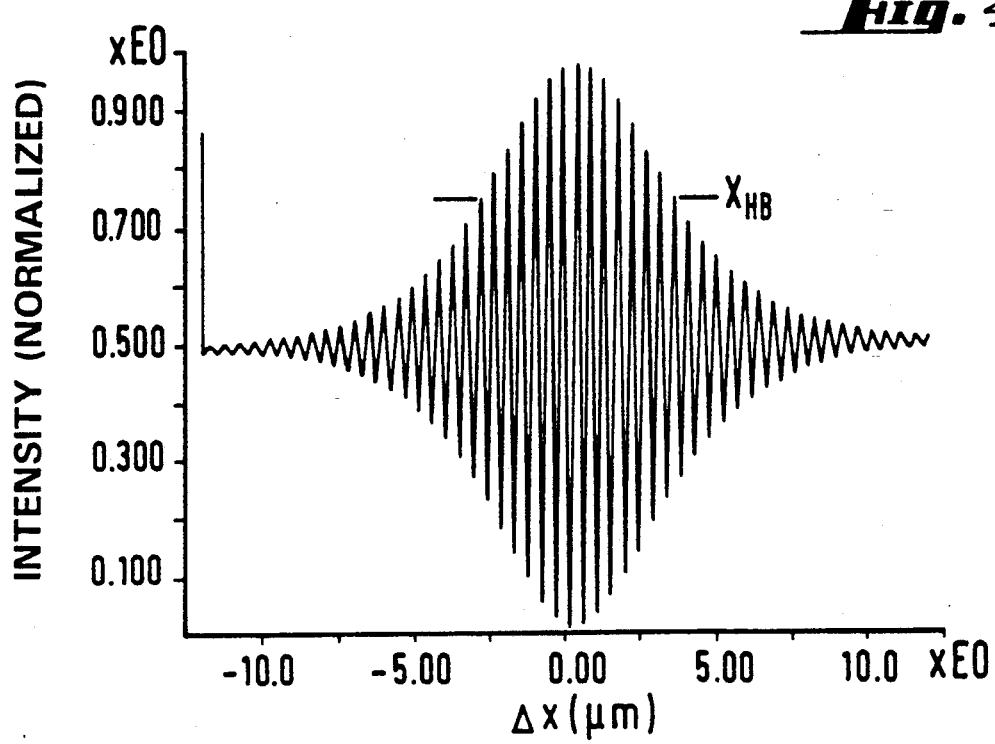
FIG. 4A illustrates the autocorrelation function for an infrared LED.
Figure 4B:
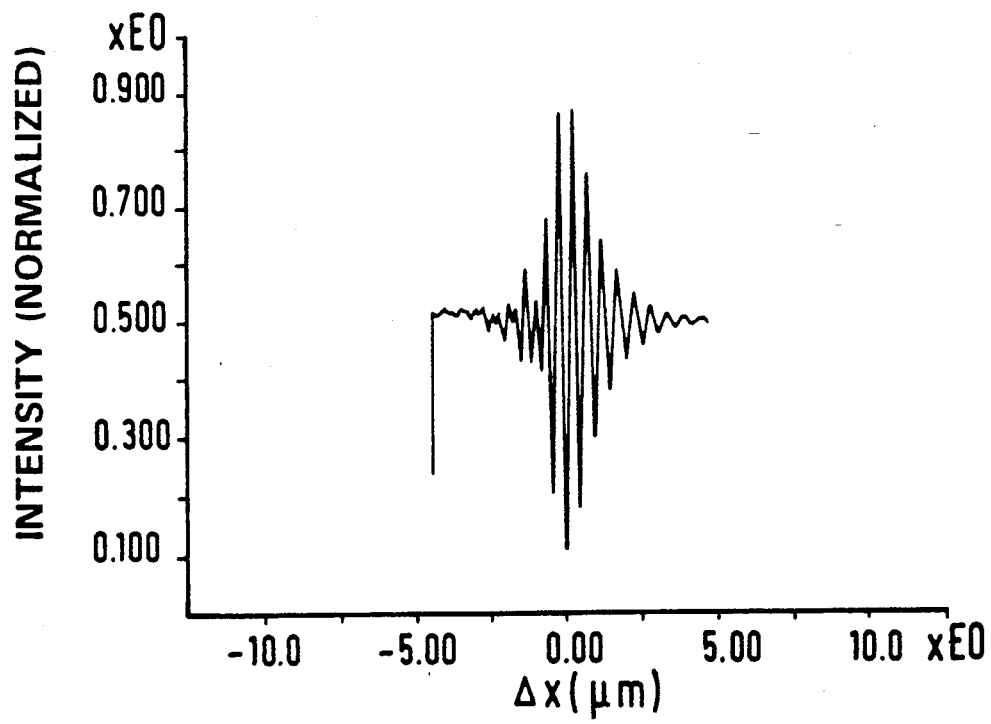
FIG. 4B illustrates the autocorrelation function for a halogen lamp.

FIG. 4A illustrates the autocorrelation function (AKF) for an infrared LED while FIG. 4B illustrates the autocorrelation function for a halogen lamp.

The above AKFs were measured with a modified Michelson interferometer and an Si photodiode. The so-called interference stripes, whose period is determined substantially by the light wavelength and the spectral sensitivity of the utilized detector, are evident. If the light source has a Gaussian spectrum, the AKF has a Gaussian enveloping curve and the coherence length is then given approximately by the half-width value $X_{HB}$ of the AKF. The relationship to the spectrum is given by an inverse Fourier transform (Wiener-kintchine theorem). The spectrum of the LED, within very close approximation, is Gaussian with a coherence length of typically, in this example, approximately 8 $\mu m$, while that of the halogen lamp is not. The optimum compensation occurs at the maximum autocorrelation.

The construction of a measuring arrangement according to a preferred embodiment of the present invention is illustrated and described below with reference to FIG. 5.

With reference to FIG. 5, light from a broad-band LED 10 or a halogen lamp passes through a polarizer POL1 via optical elements which are only suggested in the drawing. The light is beamed into one end of the LWL 4. A uniaxial birefringence is induced by a mechanical tension field which is indicated by vertical arrows in the partial area 4' of the LWL 4, i.e. within the supporting disk 3, which leads to different propagation velocities of the lightwave depending upon the direction of the polarization. The light wave which exits at the opposite end of the light waveguide, in different modes, is directed, in turn, to a liquid crystal cell 11 as a compensator element via optics which are known and which are only suggested in FIG. 5. The birefringence of the liquid crystal cell 11 can be changed electrically by a microprocessor control unit 13. After passing through polarizer POL2, the autocorrelation function (AKF) is observed by an individual photodiode 12 as a function of time depending upon the driving voltage at the liquid crystal cell 11. The maximum of the AKF is adjusted by means of a signal processing method which is known as the so-called "tracking method". Another possibility for determining the maximum of the AKF consists in a scan method which is based upon another algorithm which is described below.

The voltage which is applied at the maximum of the liquid crystal cell 11, in each instance, is a measurement for the birefringence which is to be compensated for.

Figure 6:
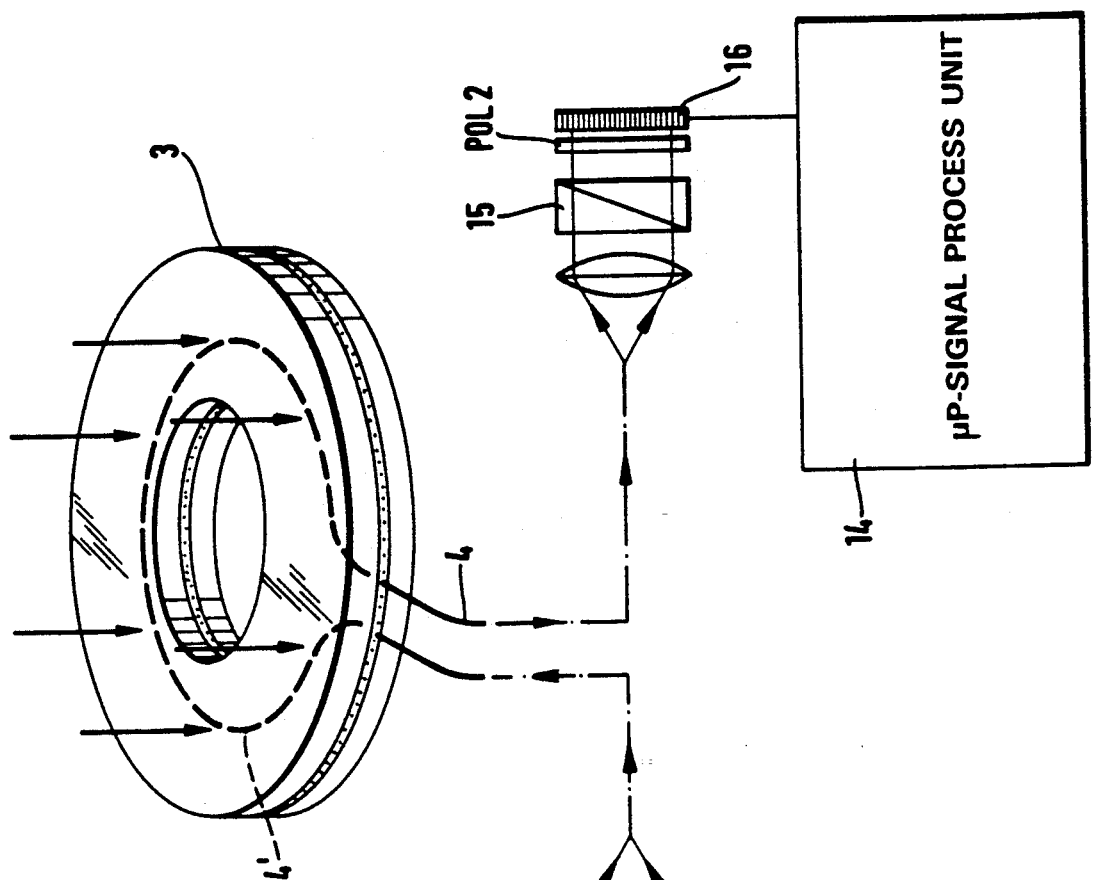
FIG. 6 illustrates the basic construction for the method, according to the present invention, for the fiber-optic measurement of force using an optical component with space-dependent birefringence, whose imaging plane is scanned by a line detector, such as, for example, a CCD array.

The basic principle of an alternate embodiment method of the present invention is explained below with reference to FIG. 6. The description of the corresponding structural component parts, which have already been described with reference to FIG. 5, will not be repeated.

In this method, the fronts of the two partial waves are directed transversely to the propagating direction by an optical component 15 with a linearly space-dependent birefringence which is due to the phase differences which are caused by the change in the birefringence. The AKF is given as a function of a spatial coordinate. This spatial coordinate can be plotted electronically by a line detector 16, which may, for example, be a CCD line array, and fed to a processor 14 for processing. Such an optical component 15 can be a Wollaston prism, a Rochon prism, a quartz wedge or a modified Michelson interferometer with slanted mirrors.

Figure 7:
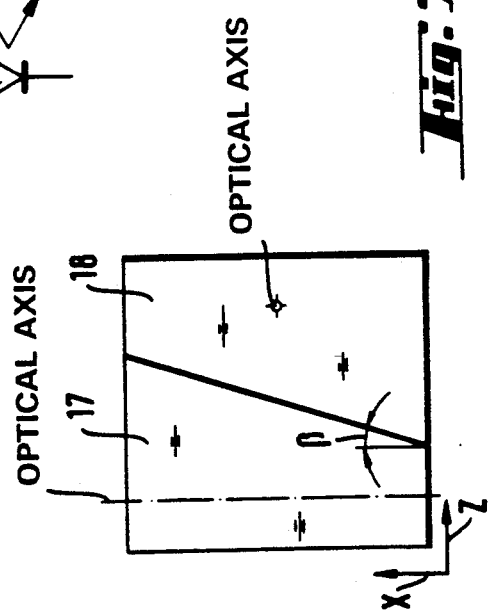
FIG. 7 illustrates the principle of a Wollaston prism for further clarification of a second embodiment of the present invention.

As illustrated in the diagram of FIG. 7, a Wollaston prism includes two birefringent wedges 17, 18, which may, for example, be quartz or calcite, with optical axes situated vertically relative to the propagation direction of the light and orthogonally relative to one another, e.g. the first wedge 17 is upward while the second wedge 18 is in the drawing plane. If a coordinate system X, Z such as that which is illustrated in FIG. 7 is selected, the space-dependent phase displacement is given by equation (1) below $$\delta(x) = 2\pi/\lambda_o 2\Delta n \ tan\beta x, \quad (1)$$

wherein $\Delta n = n_e - n_o$; and
further wherein the $n_e$ is the extraordinary refraction index and $n_o$ is the ordinary refraction index;
$\beta$ is the wedge angle of the prisms; and
$\lambda_O$ is the wavelength of the light in air.

In known or calibrated spatial dependence of the phase displacement, the location of the maximum of the AKF is a measurement for the birefringence which occurs in the LWL 4 as a result of the mechanical strain.

If the coherence length of the light source 10 is known, a scale can be made with the experimentally determined half-width value $X_{HB}$ of the AKF.

Algorithms for determining the maximum of the autocorrelation function (AKF) are described briefly below.

As described above, the AKF can be obtained as a function of time or as a function of a spatial coordinate, such as, for example, by means of a Wollaston prism. The algorithms for determining the maximum are applicable in either case. Since discrete, spatially or temporally equidistant values are determined, the curve of the AKF is described by the following equation (2):

$$I_n = m \ exp(-(x_n-x_s)^2/x_o^2) \ cos \ 2\lambda/p \ (x_n-x_s). \quad (2)$$

The mean value (equivalent proportion) is subtracted.
In equation (2), $I_n$ is the nth intensity;
m is the modulation degree;
$x_n$ is the respective spatial coordinate or the nth time value;
$x_s$ is the value of the maximum of the AKF;
$x_o$ is the half-width value; and
p is the period length (pitch) of the interference stripes.

If the so-called pixel spacing of the line detector 16 (the CCD line array) is designated by a, then $x_n$, $x_s$ and $x_o$ can also be given as fractions or multiples of a.

One of the methods for determining the maximum of the AKF is the so-called center of gravity determination. Reference is made to the IMT Report 286, PA 03/91, the contents of which are hereby incorporated by reference herein, for a detailed description. The constant proportion or the proportion occurring as background (e.g. intensity profile of the far field of the LWL 4) without interference stripes, is eliminated. Since the interference function now oscillates symmetrically around zero, the linear center of gravity determination fails. The amounts or their squares must be taken, such as for example by equation (3) below:

$$x_s = \sum_{n=1}^{N} I_n^2 n / \sum_{n=1}^{N} I_n^2 \ or \ x_s = \sum_{n=1}^{N} |I_n| n / \sum_{n=1}^{N} |I_n| \quad (3)$$

It should be noted that the center of gravity coordinate is determined in a very precise manner and it is not influenced by noise signals when there is a sufficient quantity of measuring points. However, in the practical evaluation, systematic error sources can be observed which can be caused by uneven wave fronts, a nonlinearity of the Wollaston prism, inhomogeneities of the line detector 16, and by possible errors in the force sensor 3.

In principle, the center of gravity can be made more precise by determining the phase when the CCD line array of the line detector 16 and the interference stripes, which are to be measured, are in a fixed phase relation relative to one another. For example, if a stripe width corresponds to exactly 4 pixels, a phase $\phi_n$ can be defined locally by equation (4) below:

$$I_n = exp(-(x_n-x_s)^2/x_o^2) \ cos \ (\pi/2 \ (n-n_s) - \phi_n). \quad (4)$$

The local phase can be then calculated from equation (5) below:

$$\phi_n = arctan \ (S(X_n)/C(X_n)) \quad (5)$$

with the auxiliary variables $S(x_n)$ and $C(x_n)$ and averaged by N. $S(x_n)$ and $C(x_n)$ are, in turn, defined by the following equations: (6) and (7), respectively:

$$S(x_n) = I_{n-1} - I_{n+1}; \quad (6)$$

$$C(x_n) = I_n - \tfrac{1}{2}(I_{n+2} + I_{n-2}). \quad (7)$$

Another algorithm which takes into account the entire curve shape and, accordingly, encompasses the center of gravity determination and phase measurement, is a non-linear Fit according to the smallest square error with the function, which is given by equation (8) below:

$$I_n = \exp(-(x_n - x_s)^2/x_o^2)\cos 2\pi/p \,(x_n - x_s), \quad (8)$$

where m, $x_s$, $x_o$ and p designate the Fit parameters.

Test results, which demonstrate the practical usefulness of the method and apparatus of the present invention with both of the described methods, are presented below.

In a given embodiment, from which the test results are obtained, a type 1A225 diode, from the firm ABB-Hafo, is selected as the light source 10 the means by which an output of several 100 nW can be coupled into a single-mode LWL 4, which has a core diameter of 6μm. The wavelength is 880 nm with a full half-width value of approximately 50 nm. The "S Type" line detector, by the firm Reticon, which is outfitted with satellite and base plates and 512 detector elements and which further has a rectangular detector surface of 25 μm·×2.5 mm, is used as the line detector 16. The Wollaston prism, which serves as the optical component 15, is produced from quartz and has a space-dependent phase displacement of $2\pi$ to 0.1 mm. If the interference stripes are received with the CCD line array directly in contact with the Wollaston prism, there results approximately 4 pixels per interference stripe.

Figure 8:
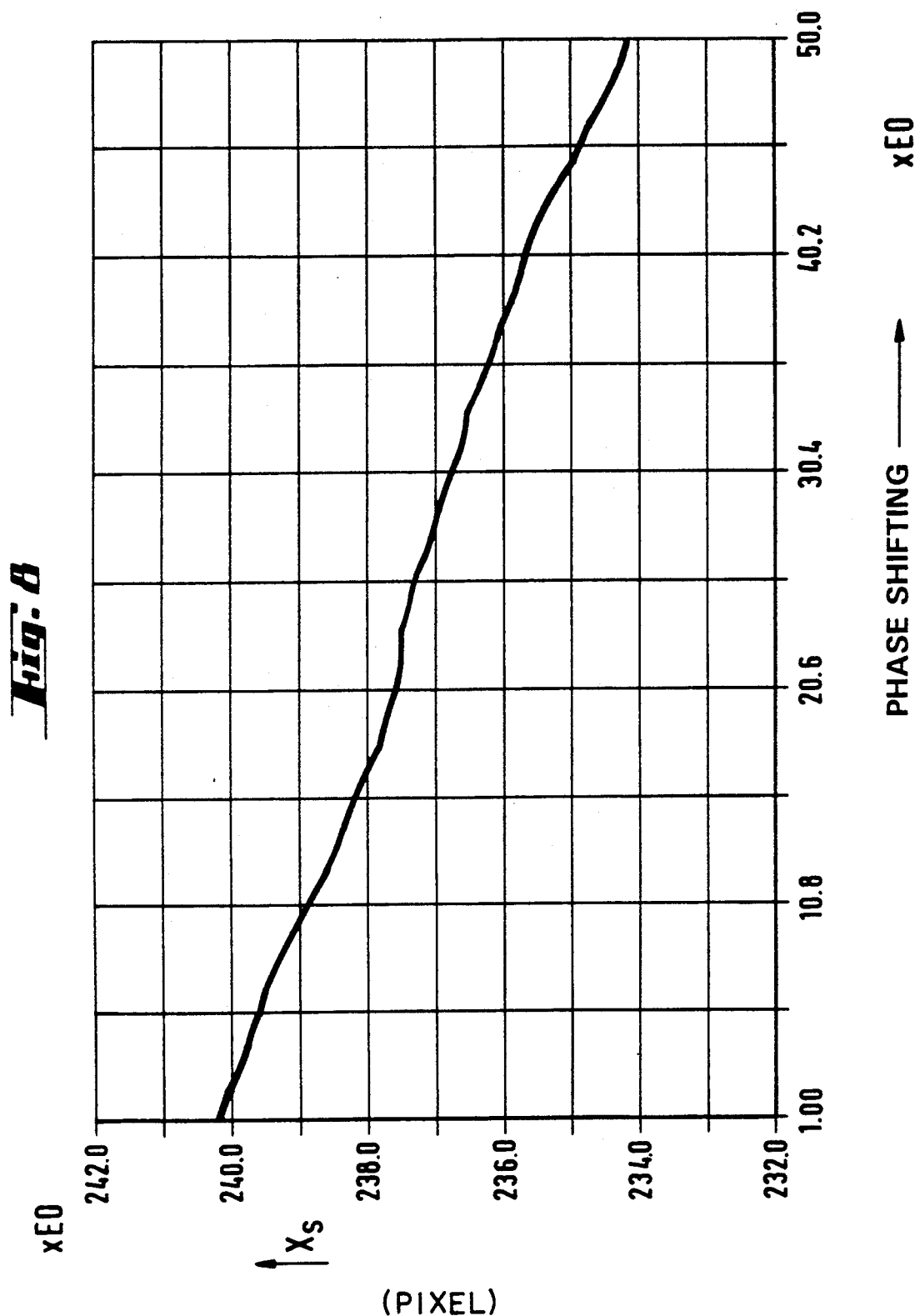
FIG. 8 illustrates measurement results in the second method embodiment according to the present invention with the use of a simulated force sensor.

In a first measurement of the embodiment example, a variable Soleil-Babinet compensator is employed in order to simulate the fiber-optic force sensor. However, only a small phase displacement of approximately one stripe width (4 pixels) can be realized with this. FIG. 8 illustrates the measurement result for this embodiment. As shown in FIG. 8, a very linear relationship results for this relatively narrow range.

Figure 9:
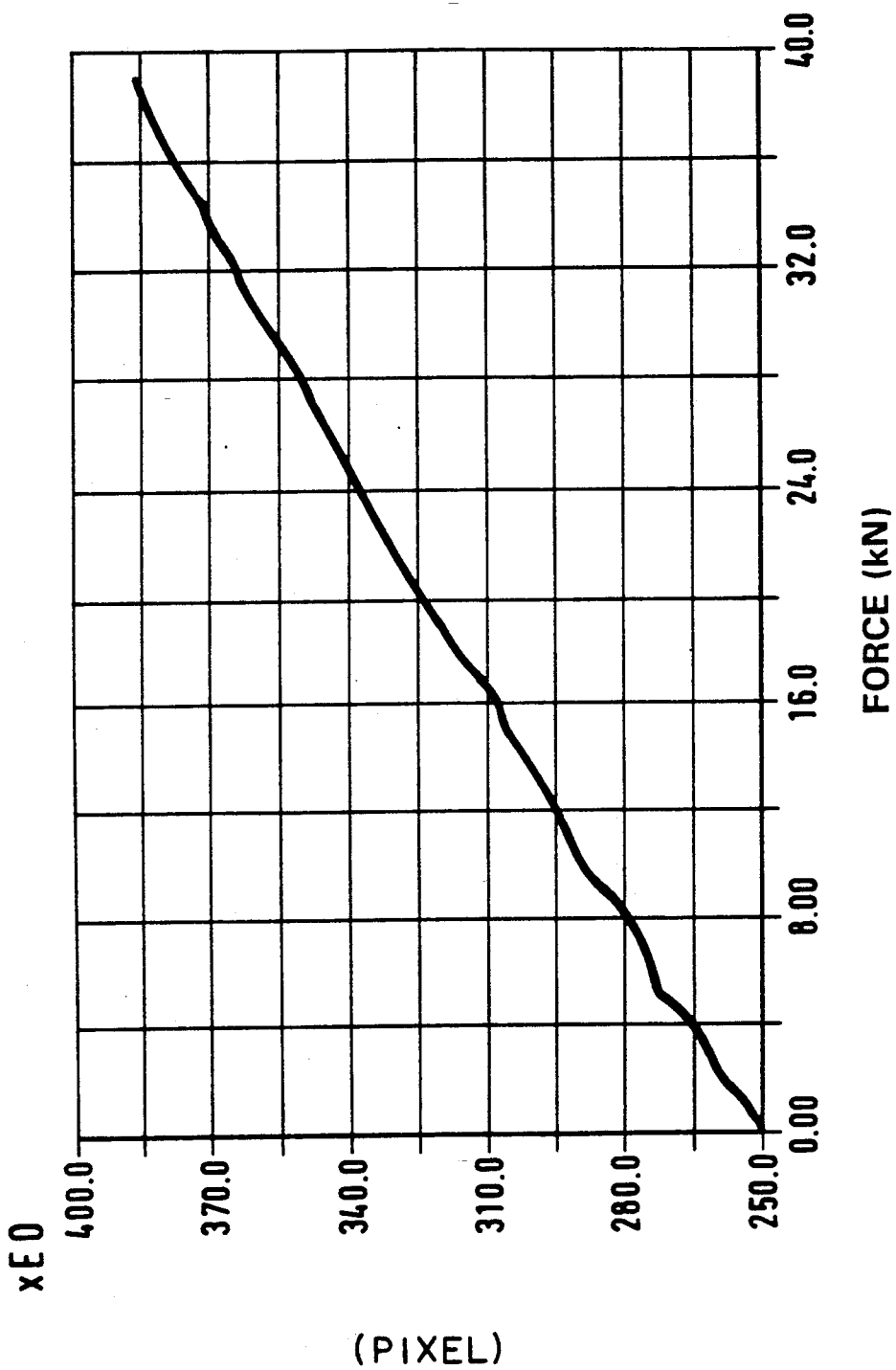
FIG. 9 illustrates the results of a series of measurements according to the second method of the present invention with the use of a sensor disk with embedded light waveguide, as is illustrated in FIG. 3.

FIG. 9 illustrates the measurement results obtained when a corresponding measurement was carried out at the sensor disk 3 with an embedded light waveguide 4.

While the present invention has been described in various preferred embodiments, such descriptions are merely illustrative of the present invention and are not to be construed as limitations thereof. In this regard, the present invention is meant to encompass all modifications, variations and/or alternate embodiments with the scope of the present invention limited only by the claims which follow.

What is claimed is:

1. A method for the fiber-optic measurement of force, which is based on a strain-induced birefringence of a single-mode light waveguide, which is embedded at least along a part of its length in a plane situated vertically relative to a pretensioning force between disks which distribute said pretensioning force along surfaces thereof, which comprises the steps of:

beaming polarized, non-coherent light into one end of a light waveguide wherein a phase difference, of two linear modes of said light waves which exit at an opposite end of said light waveguide, is caused by said force which acts on said light waveguide;

compensating for a consequent change in a birefringence in order to achieve measurements; and evaluating a control signal which is required for compensation as a measurement of said force.

wherein a liquid crystal cell, the birefringence of which is constantly changed by said control signal, is utilized as a compensator element, and further wherein changes in intensity, shown on said liquid crystal cell as an image of an autocorrelation function, as a function of said control signal, are photoelectrically detected, and further wherein a reading signal is automatically checked at the maximum of the autocorrelation function.

2. The method of claim 1, wherein said maximum of said autocorrelation function is determined by a regulating process for determining a respective voltage value of said control signal.

3. The method of claim 1, wherein said maximum is determined by determining a plurality of intensity values lying within a coherence length by an algorithm, which is suitable for a center of gravity determination.

4. A method for the fiber-optic measurement of force, which is based on a strain-induced change in birefringence of a single-mode light waveguide, which is embedded at least along a part of its length in a plane situated vertically relative to a pretensioning force between disks which distribute said pretensioning force along the surfaces thereof, which comprises the steps of:

beaming polarized, non-coherent light into one end of said light waveguide wherein a phase difference, of two linear modes of said light waves, which exit at an opposite end of said light waveguide, is caused by said force which acts on said light waveguide; and determining a consequent change in birefringence in order to achieve definite measurements, wherein fronts of said two light waves, which exit with linear modes, are directed transversely relative to a propagation direction by means of an optical component with a linearly space-dependent birefringence, and further wherein an autocorrelation function, which is imaged on a surface of said optical component from which said light exits, is determined by a line detector, and further wherein a selection signal sequence is evaluated in a computing process for determining a maximum of said autocorrelation function.

5. The method of claim 4, wherein said optical component with linearly space-dependent birefringence is one of a Wollaston prism and a Rochon prism and a quartz wedge and a Michelson interferometer outfitted with slanted mirrors.

6. An apparatus for the fiber-optic measurement of force, based on a strain-induced birefringence of a single light waveguide, which comprises:

a single-mode light waveguide;

a plurality of disks; and a liquid crystal cell;

wherein said single-mode light waveguide is embedded, at least along a part of its length in a plane situated vertically relative to a pretensioning force between said plurality of disks which distribute said pretensioning force along the surfaces thereof, and further wherein polarized, non-coherent light is beamed into one end of said light waveguide and a phase difference, of two linear modes of light waves, which exit at an opposite end of said light waveguide, is caused by said force which acts on said light waveguide, and further wherein at least one of a consequent change in said birefringence is compensated for in order to achieve definite measurements and a control signal, required for compensation is evaluated as a measurement for said force;

and further wherein said liquid crystal cell, the birefringence of which is constantly changed by said control signal, is used as a compensator element, and wherein changes in intensity, which are shown on said liquid crystal cell as an image of said autocorrelation function, as a function of said control signal, are photoelectrically detected, and further wherein a selection signal is automatically checked at a maximum of said autocorrelation function.

7. The apparatus of claim 6, wherein said maximum of said autocorrelation function is determined by a regulating process for determining a respective voltage value of said control signal.

8. The apparatus of claim 6, wherein said maximum is determined by determining a plurality of intensity values lying within a coherence length by an algorithm which is suitable for a center of gravity determination.

9. An apparatus for the fiber optic measurement of force, based on a strain-induced change in birefringence of a single-mode light waveguide, which comprises:
 a single-mode light waveguide;
 a plurality of disks;
 an optical component with a linearly space-dependent birefringence; and
 a line detector;
 wherein said single-mode light waveguide is embedded, at least along a part of its length, in a plane situated vertically relative to a pretensioning force between said disks which distribute said pretensioning force along the surfaces thereof, and further wherein polarized, non-coherent light is beamed into one end of said light waveguide and a phase difference, of two linear modes of light waves which exit at an opposite end of said light waveguide, is caused by said force, which acts on said light waveguide, and further wherein a consequent change in said birefringence, is determined in order to achieve definite measurements,
 and further wherein fronts of said light waves, which exit with said linear modes, are directed transversely relative to a propagation direction by means of said optical component, and further wherein an autocorrelation function, which is imaged on a surface of said optical component from which said light waves exit, is determined by said line detector and wherein a selection signal sequence is evaluated in a computing process for determining a maximum of said autocorrelation function.

10. The apparatus of claim 9, wherein said optical component with linearly space-dependent birefringence is one of a Wollaston prism and a Rochon prism and a quartz wedge and a Michelson interferometer outfitted with slanted mirrors.

* * * * *